United States Patent [19]

Sanborn

[11] Patent Number: 4,929,351

[45] Date of Patent: May 29, 1990

[54] PORTABLE ULTRA-FILTRATION SYSTEM

[75] Inventor: George W. Sanborn, Walpole, Mass.

[73] Assignee: Sanborn, Inc., Wrentham, Mass.

[21] Appl. No.: 357,685

[22] Filed: May 26, 1989

Related U.S. Application Data

[63] Continuation of Ser. No. 256,749, Oct. 12, 1988, abandoned.

[51] Int. Cl.$^5$ .............................................. B01D 61/18
[52] U.S. Cl. ................................. 210/195.2; 210/257.2
[58] Field of Search ............................... 210/651–653, 210/195.1, 195.2, 194, 805, 806, 804, 103, 167, 168, 257.2, 321.6, 321.72

[56] References Cited

U.S. PATENT DOCUMENTS

| | | | |
|---|---|---|---|
| 4,086,164 | 4/1978 | Noda et al. | 210/651 |
| 4,636,317 | 1/1987 | Lewis . | |
| 4,692,251 | 9/1987 | Hilgren | 210/651 |

Primary Examiner—Frank Sever

Attorney, Agent, or Firm—Nutter, McClennen & Fish

[57] ABSTRACT

An inexpensive portable ultra-filtration system for concentrating industrial waste fluids such as cutting coolant. The system is adapted for convenient use with standard storage containers. It is lightweight, portable, and reliable, and processes waste fluids in conformance with most local environmental regulations. Its low cost makes it ideal for small volume applications. The system operates by continuously recycling the waste fluid through a cartridge prefilter and then a carriage ultrafilter. It can process a fifty-five gallon drum of contaminated coolant to yield fifty gallons of clear permeate and only five gallons of concentrated contaminated mixture in about twenty-four hours. The clear permeate can be directly sewered in most locales. An inlet pipe may be used to keep the point of waste fluid intake above most of the heavy contaminants such as sludge, thereby lengthening the operating life of the filters. If necessary, post-process filters for the clear permeate can be conveniently installed in a frame which hangs on the side of a storage container.

14 Claims, 8 Drawing Sheets

PORTABLE ULTRA-FILTRATION SYSTEM

FIELD OF THE INVENTION

This invention relates generally to filtration systems, and particularly to the recovery of water from contaminated metalworking fluids.

BACKGROUND OF THE INVENTION

Cutting tools are commonly used to perform metalworking processes such as drilling, turning, forming, sawing, grinding, milling, tapping, threading, honing, broaching, and similar machining operations. Metalworking process efficiency is highly dependent on proper lubrication and cooling of both the cutting tool and a work piece.

Many different types of cutting fluids, or coolants, have been designed to meet the lubrication and cooling requirements of diverse situations. The most widely used metalworking coolants are soluble oils. Such soluble oils are typically an emulsion of a soluble mineral oil and an emulsifier such as soap and water, in water to oil proportions ranging from 100:1 to 5:1. They enjoy popularity because they combine the lubricating abilities of oil with the better cooling abilities of water, and are relatively easy to manufacture.

Most machine tools recirculate coolant during their operation. Coolant contamination is inevitable, however, so that at some point the coolant must be changed. Contamination originates from many sources. Fine metal particles and detritus from the metalworking operations accumulates as abrasive sludge. Dirt and rust, as well as lubricants and hydraulic fluids from the machine tools themselves (tramp oil), invariably find their way into the coolant. Bacteria and fungi often flourish in oil-water mixtures, giving rise to the formation of corrosive acids. The result is not only offensive odors, but also significantly reduced coolant efficiency. The coolant can be filtered to remove metal particles and skimmed to remove sludge, but at some point the coolant simply is no longer effective, and must be thrown away.

In the not too distant past, the spent coolant could be disposed of by simply bringing it to the local landfill. As society has come to realize, careless waste disposal often creates a major health hazard. Oily industrial waste waters such as spent coolant are now considered by many environmental regulatory agencies as hazardous material. They can be shipped only to specified hazardous dump sites which may be located many miles from where the waste is generated. Careful disposal record-keeping must be maintained — in some locations, expensive chemical analysis on each shipment is even required. The resulting transportation, fees, taxes, and administrative expenses mean that the disposal cost of coolant often exceeds its original purchase price.

The cost of coolant disposal thus increases the total cost of a given metalworking operation. In fact, the cost of waste coolant disposal now has a significant impact on the profit margin of small metalworking shops which typically produce less than one thousand or so gallons of waste fluid per month. In that environment, spent coolant is typically handled by first collecting it in fifty-five gallon drums. The drums are then periodically shipped to an approved waste site for disposal.

There have been prior attempts to minimize the cost of waste disposal. As previously mentioned, most cutting coolant is as much as ninety percent water by volume. For every ten drums or so of contaminated coolant, then, there really is only one drum of hazardous material. It is advantageous if the contaminated coolant can be first processed into a concentrate. A mobile system for cleaning and recovering coolant is described in U.S. Pat. No. 4,636,317. That system includes a solid separation filter, a sterilizer for removing bacteria by pasteurization or radiation, a disk bowl centrifuge, and storage tanks for holding extracted contaminants. It is physically large enough to require a truck for transport.

The purchase price of such treatment equipment, however, is in the tens of thousands of dollars. This is simply too expensive for small metalworking shops to purchase. As one alternative to shipping the untreated coolant, they can hire or lease a mobile recovery system to periodically process the waste into concentrate on the shop premises. They then need to ship only the concentrated fluid to the approved waste site. However, even the cost of hiring a recovery system and shipping the processed waste tends to make it difficult for small metalworking shops to price their services competitively with larger shops.

So-called ultra-filtration systems are also known which use a semi-permeable membrane as a filter to separate contaminants. While ultra-filtration technology has been found useful in high-volume applications, its application until now in low-volume applications has also been limited because of high cost and the difficulty in applying this technology to treat waste water stored in drums.

SUMMARY OF THE INVENTION

Broadly speaking, it is an object of this invention to provide a portable, inexpensive, and convenient way to process industrial waste fluids prior to their disposal.

Briefly, in accordance with the invention, waste fluids are drawn out of a storage container and passed through an ultra-filter. A concentrate outlet from the ultra-filter discharges waste fluid back into the container. A permeate outlet from the ultra-filter provides water which is practically oil-free, and sewerable in most locations. The entire unit is sufficiently small and portable as to be easily mountable on the top of a fifty-five gallon drum. The unit is easily manufactured from readily available materials and thus is cost-effective for small metalworking shops to use.

More particularly, a filtration unit constructed in accordance with the invention includes a base member for engaging the top of an open storage container such as a standard fifty-five gallon drum. A pump, a cartridge prefilter, a cartridge ultra-filter, and a pressure regulating valve are mounted on the base member. The pump is arranged to circulate waste fluid from the container through the two filters and back into the container. A pole mounted on the base may be used to mechanically support the two filters in vertical orientation and to provide a convenient mounting place for the pressure regulator.

An inlet pipe or hose may be mounted to an inlet port of the filtration unit. The pipe is somewhat shorter than the height of the container, and provides a way to intake fluid from a lower middle portion of the container.

A frame can be easily attached to the storage container to hold post-process filters where necessary.

A waste fluid filtration system built in accordance with this invention has several advantages. It is an inexpensive, portable, drum-mounted unit, with only a few components, and thus affords simple installation, convenience of use, and reliable operation.

The invention separates water from the soluble oils found in machine coolants, thereby greatly reducing the volume of waste fluid needing disposal at an approved hazardous dump site. It can process a fifty-five gallon drum of contaminated coolant to yield fifty gallons of clear fluid, leaving only five gallons of contaminated oil and water mixture after about twenty-four hours of operation. The clear fluid permeated by the system can be directly sewered in most circumstances, depending upon its biochemical oxygen demand (BOD).

The invention thus significantly reduces the cost of coolant storage and disposal, by as much as ninety percent. The separation process is purely mechanical, and thus will consistently comply with standard waste disposal specifications, unlike some types of chemical processes.

The inlet pipe keeps the point of waste fluid intake above most of the metal particles and other heavy contaminants such as sludge, which lengthens the operating life of the filters.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
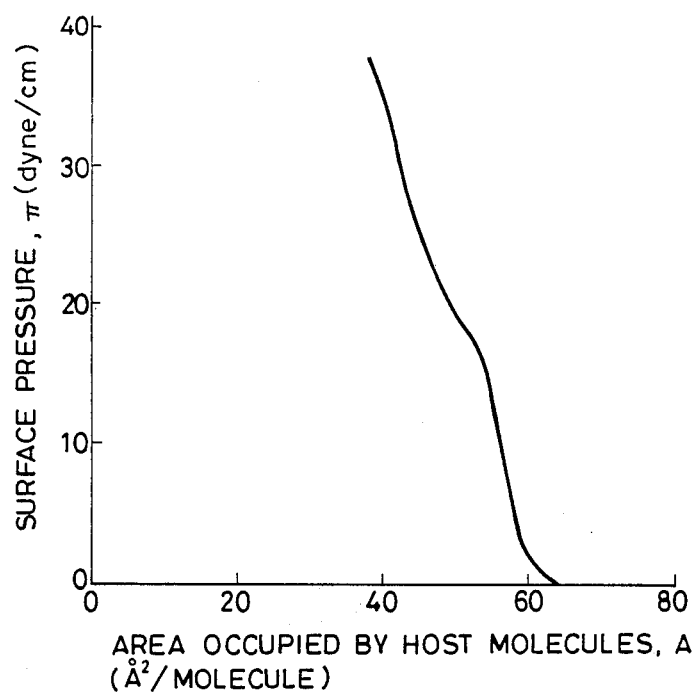
FIG. 1 is an perspective view of a portable ultra-filtration system stationed above a standard fifty-five gallon container in accordance with the invention.

Referring to the drawings more particularly, FIG. 1 shows a portable ultra-filtration system 10 positioned, in accordance with the invention, on top of a container 12 such as a standard fifty-five gallon drum. The filtration system 10 includes a base member 14 adapted to engage the periphery of the container 12. The base 14 also provides mechanical support of the other components of the filtration system 10. Preferably, the base 14 does not mechanically attach to the container 12, but merely rests on top of it. Base 14 is preferably formed of cast aluminum or other strong, lightweight material, which is impervious to damage by the fluid stored in the container 12. Cover 16 is formed of any convenient lightweight material, preferably a chemically resistant plastic. As will be discussed in some detail, other components of filtration system 10 not shown in FIG. 1 are enclosed by the cover 16. These are also made of lightweight materials so that the entire filtration system 10 is easily lifted and moved to another container when processing of container 12 is complete.

Figure 2:
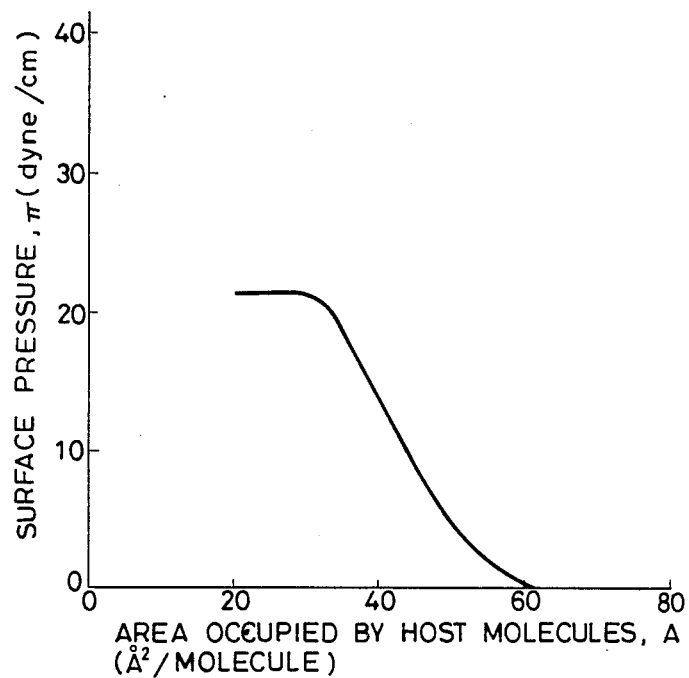
FIG. 2 is a close-up perspective view of the exterior of the filtration system.
Figure 1:
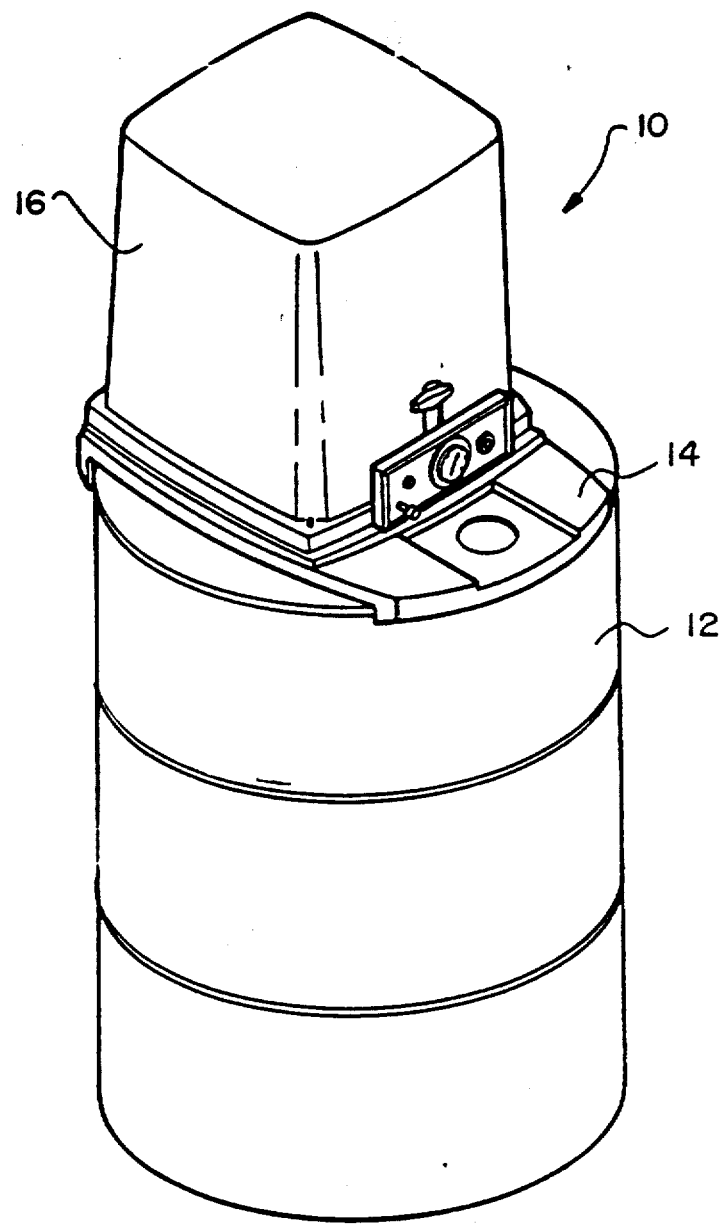
Figure 2:
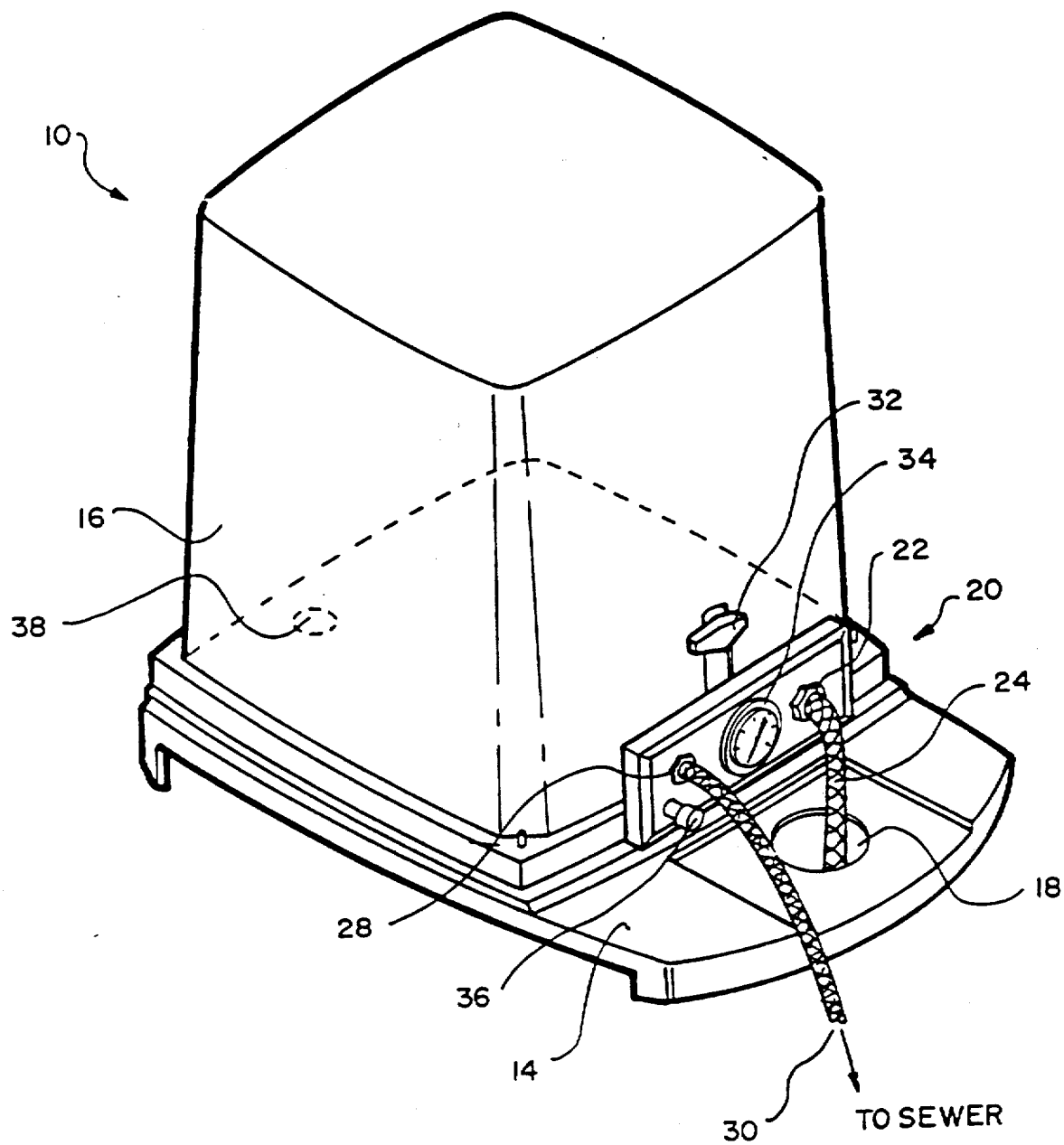

FIG. 2 shows the exterior of the filtration system 10 in greater detail. A forward hole 18 formed in the front of the base 14 allows access to waste fluid stored in the container 12. A front panel portion 20 of the cover 16 is disposed adjacent the forward hole 18. Front panel 20 includes a fluid inlet 22, a permeate outlet 28, a throttling pressure valve 32, a pressure gauge 34, and an air inlet 36. A conduit such as a flexible inlet hose 24 is coupled to the fluid inlet 22 and fed down through the forward hole 18 so that the filtration system 10 can draw fluid from the container 12. A permeate hose 30 is also connected between the permeate outlet 28 and the sewer connection or other place where the clean permeate is to be routed. An air inlet 36 is used to enable connection of a source of compressed air to drive the operation of the filtration system 10. A concentrate outlet 38 provides a discharge path back into the container 12 for unfiltered concentrated fluid. Concentrate outlet 38 is preferably located in the rear of base 14.

Figure 3:
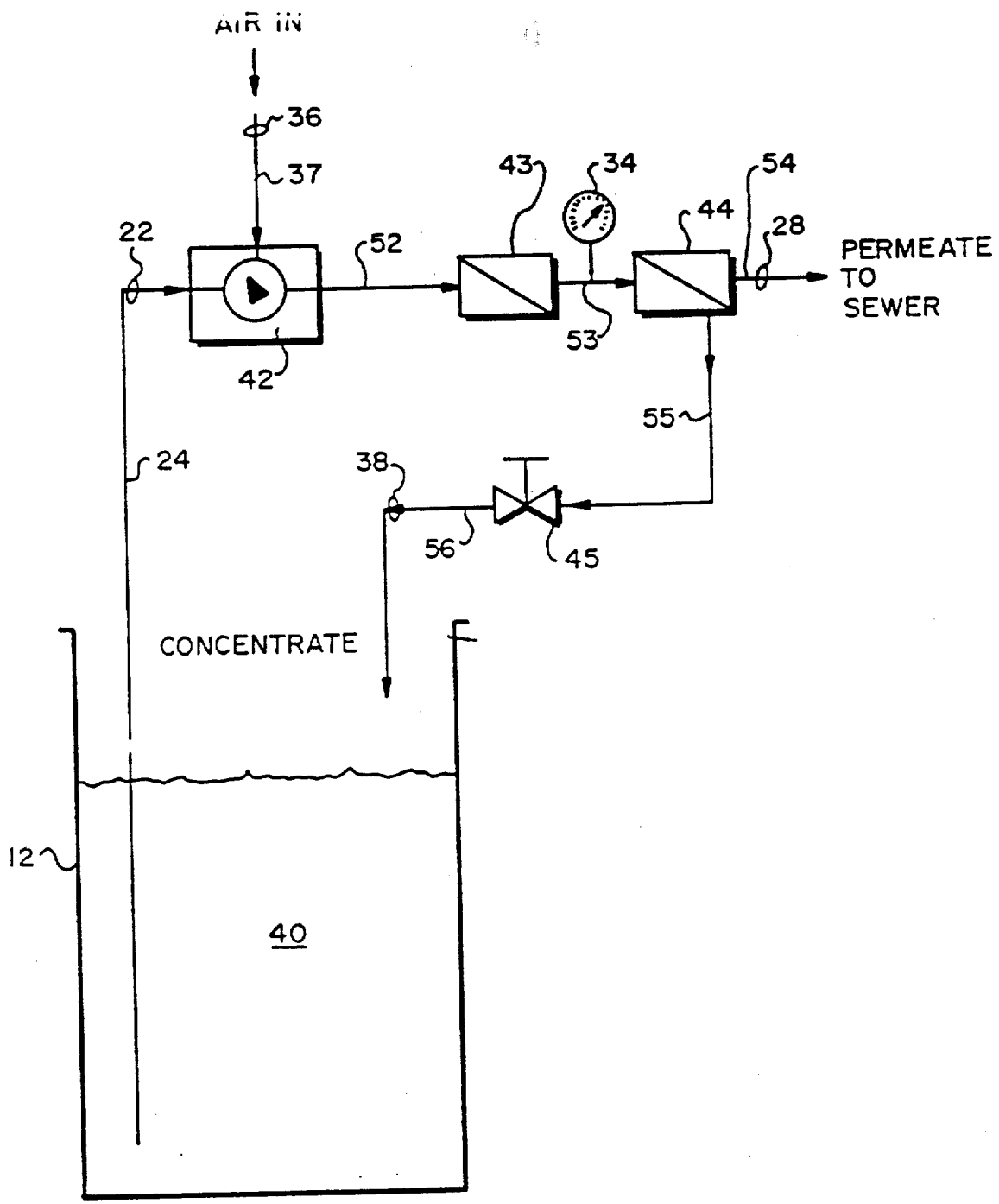
FIG. 3 is a schematic diagram of the filtration system's fluid circuit.

The components of filtration system 10 and their preferred fluid circuit arrangement are shown in FIG. 3. The components include a pump 42, a prefilter 43, the pressure gauge 34, an ultra-filter 44, and the valve 32. Dirty waste fluid 40 is drawn from the container 12 through the inlet hose 24 and fluid inlet 22 by the suction action of pump 42. Pump 42 is preferably an air-operated diaphragm pump because of its simple construction and minimum weight. A compressed air source (not shown) provides pressurized air required to drive pump 42 through the air inlet 36 and an air line 37. Electric or other types of pumps would also suffice, as long as they are capable of maintaining a flow rate of approximately five gallons per minute at a discharge pressure of at least fifty pounds per square inch.

The fluid discharged from pump 42 is routed through a hose 52 to the prefilter 43. The primary function of prefilter 43 is to remove coarse metal particles, plastic, wood chips, and other such contaminates that tend to plug up or even damage the ultra-filter 44. Prefilter 43 is preferably a standard, inexpensive, cellulose 100$\mu$-rated cartridge filter.

After passage through the prefilter 43, the fluid is passed to the ultra-filter 44 via a tube or hose 53. The ultra-filter 44 is fabricated as a cartridge which fits a standard cartridge casing such as that commonly used for the prefilter 43. The preferred ultra-filter 44 is a spiral wound oleophobic and hydrophilic membrane filter having approximately fourteen square feet of surface area. Relatively small water molecules easily pass through such a membrane as permeate. Larger colloidal molecules such as oil and grease do not pass through or adhere to such a membrane surface, and thus exit the cartridge as concentrate.

The ultra-filter 44 thus has two outlets, one for permeate coupled to the permeate outlet 28 via a hose 54, and one for concentrate, coupled to the pressure valve 32 via hose 55. The fluid passed from the ultra-filter 44 to permeate outlet 28 is permeated clear fluid. With the preferred arrangement, this permeated fluid has been found to have less than 100 milligrams per liter of soluble oil and thus is directly sewerable in most locations. Alternatively, the clear permeate can sometimes be mixed with new coolant, or used in other plant processes, such as parts washing. Fluid passed from ultra-filter 44 through the pressure valve 32 is in turn discharged back into the container 12 through another hose 56 and the concentrate outlet 38. Pressure valve 32 maintains the required pressure on the membrane of ultra-filter 44. Pressure gauge 34 is preferably arranged to monitor this pressure at the inlet to ultra-filter 44.

The basic filtration system 10 described in FIG. 3 was constructed and tested on a typical soluble coolant. It was found that a pressure of approximately forty pounds per square inch is best, being high enough to force water through the membrane, while still low enough to allow a surface flow sufficient to keep the membrane clean. The system was found to reduce the volume of coolant in a full fifty-five gallon drum by at least ninety percent within twenty-four hours of continuous operation. Depending upon how dirty the coolant is, a prefilter 43 usually lasts for several fifty-five gallon drums. The more expensive ultra-filter 44 needs to be replaced much less often.

Thus, although the flow rate of permeate out of the filtration system 10 is quite low (two gallons per hour in the constructed example system), and although the fluid must be recycled many times through the ultra-filter 44, the system 10 is a quite cost efficient way to handle the volume of waste coolant generated by a typical small metalworking shop.

Figure 4:
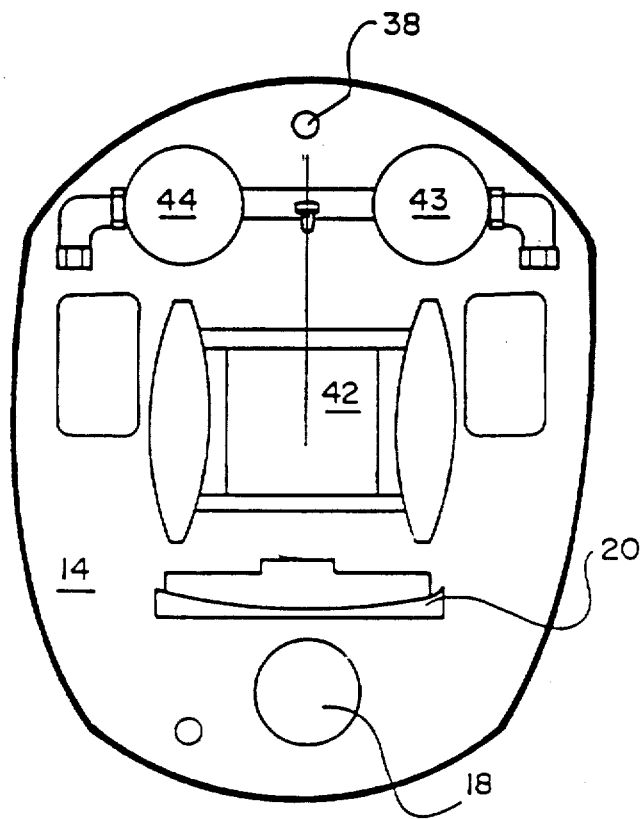
FIG. 4 is a top view of the components of the filtration system showing their preferred layout on a base member.

FIG. 4 is a top view of the major components of filtration system 10 showing their preferred physical layout. Forward hole 18 is formed in a front portion of the base 14. Front panel 20 is mounted directly behind forward hole 18 to provide access for the inlet hose 24 (not shown in FIG. 4). Prefilter 43 and ultra-filter 44 are positioned vertically and to the rear of base 14. The pump 42 is disposed between the front panel 20 and the filters 43 and 44. Concentrate outlet 38 is positioned in base 14 to provide easy access to container 12 from the outlet of the valve 32.

Figure 5:
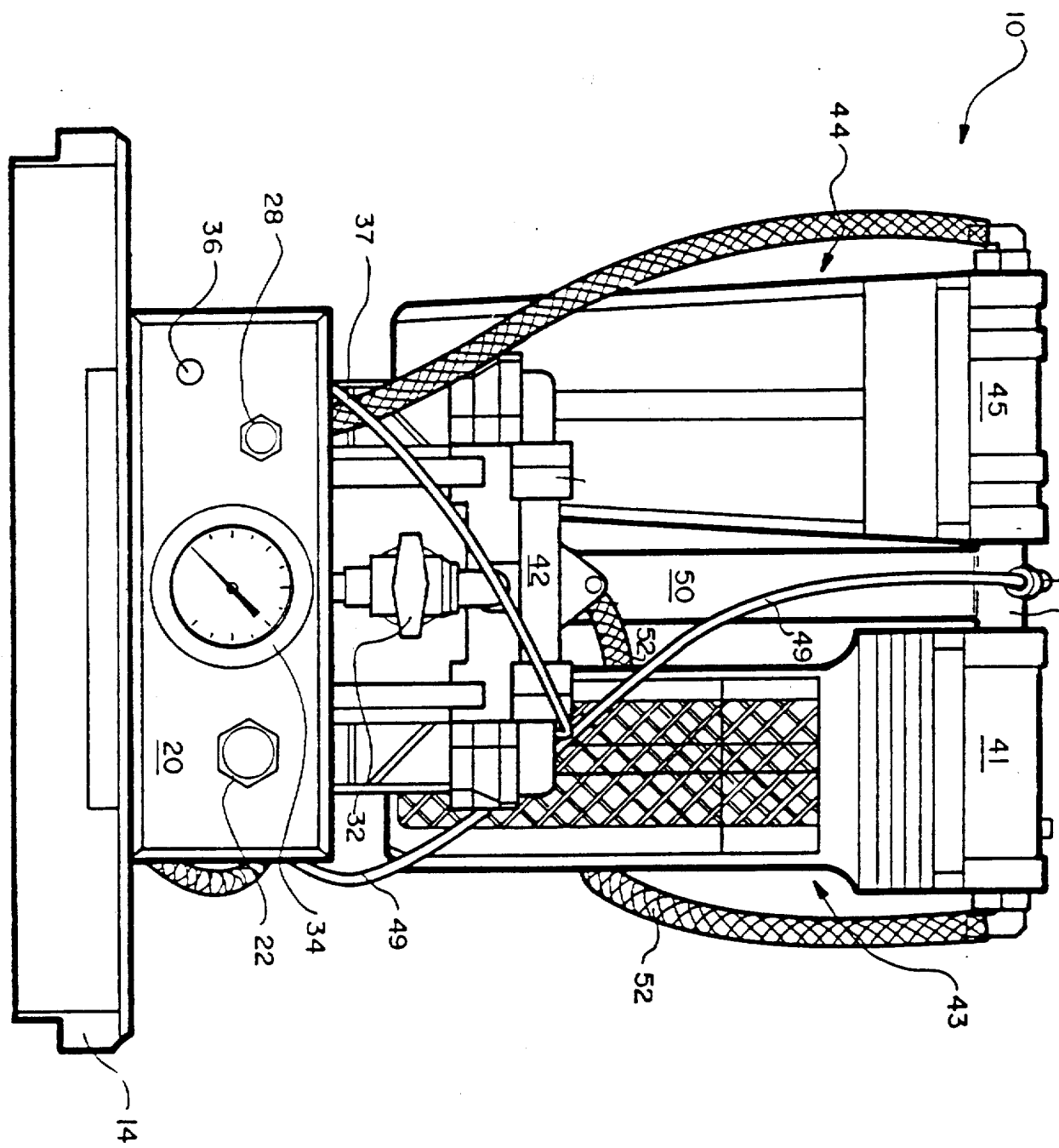
FIG. 5 is a front view of the filtration system with the cover removed and further showing the arrangement of the components.
Figure 6:
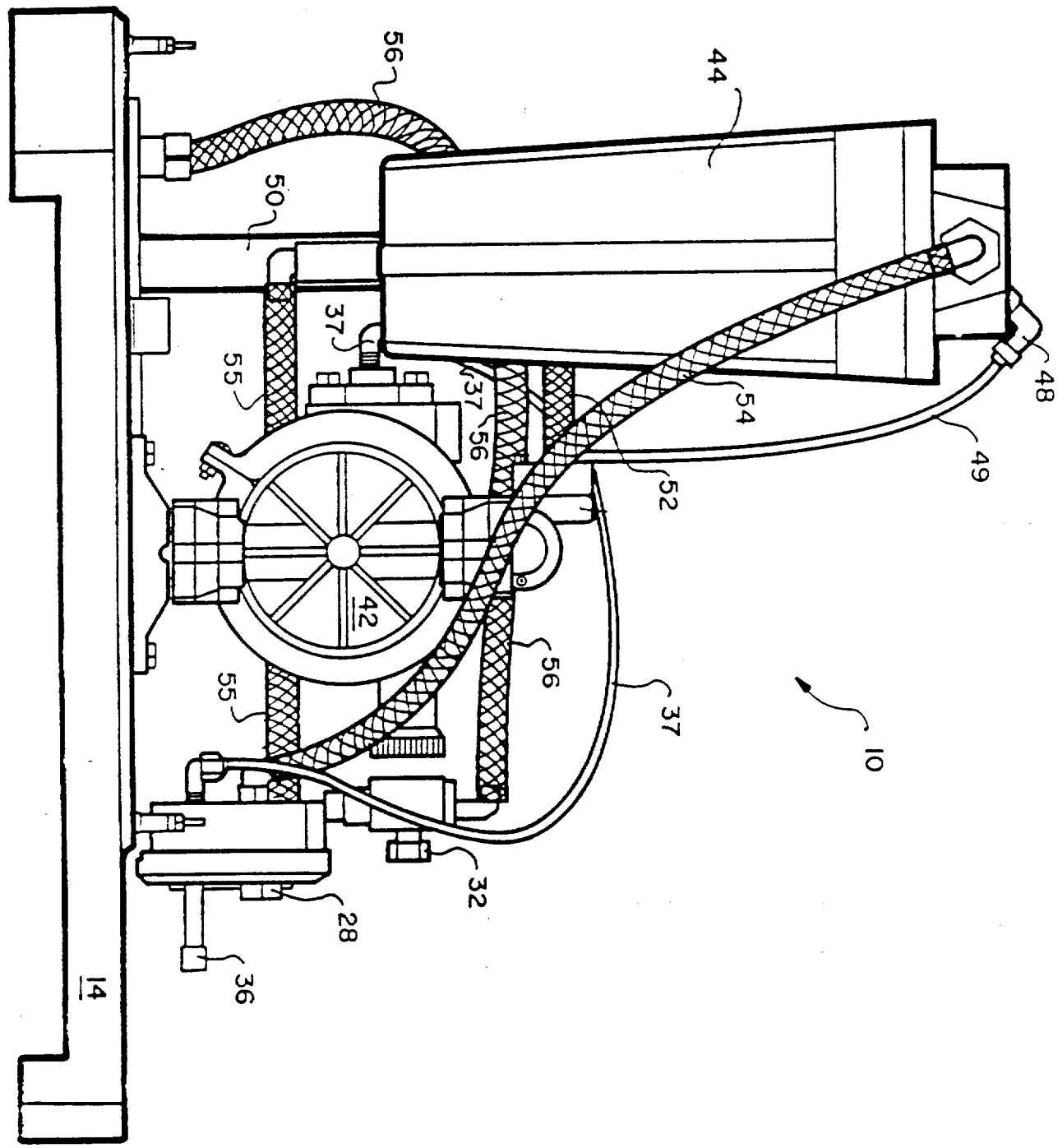
FIG. 6 is a side view of the filtration system.

FIGS. 5 and 6 are pictorial front and side views further showing the preferred mechanical configuration of the filtration system 10. Housings 41 and 45 are provided for the cartridge prefilter 43 and ultra-filter 44, respectively, and are positioned vertically and to the rear of base 14. Housings 41 and 45 are standard cartridge-filter-type housings. Of significance is the way in which the prefilter housing 41 and ultra-filter housing 45 are mounted on the base 14. In particular, the base 14 has a vertical support 50 mounted thereon or formed therewith. The tube 53 is mounted perpendicular to the upper end of the support 50 to provide a tee-shaped support for as well as a fluid conduit between prefilter 43 and ultra-filter 44. One end (the right end in the view of FIG. 5) of the tube 53 is mated to the outlet of the prefilter housing 41, and the other end to the inlet of the ultra-filter housing 45. Tube 53 also provides a convenient place for attaching a pressure line connector 48 and hose 49 used by the pressure gauge 34. The positioning of the various hoses 49, 52, 54, 55, and 56 and air line 37 is also evident from inspection of FIGS. 5 and 6.

Figure 7:
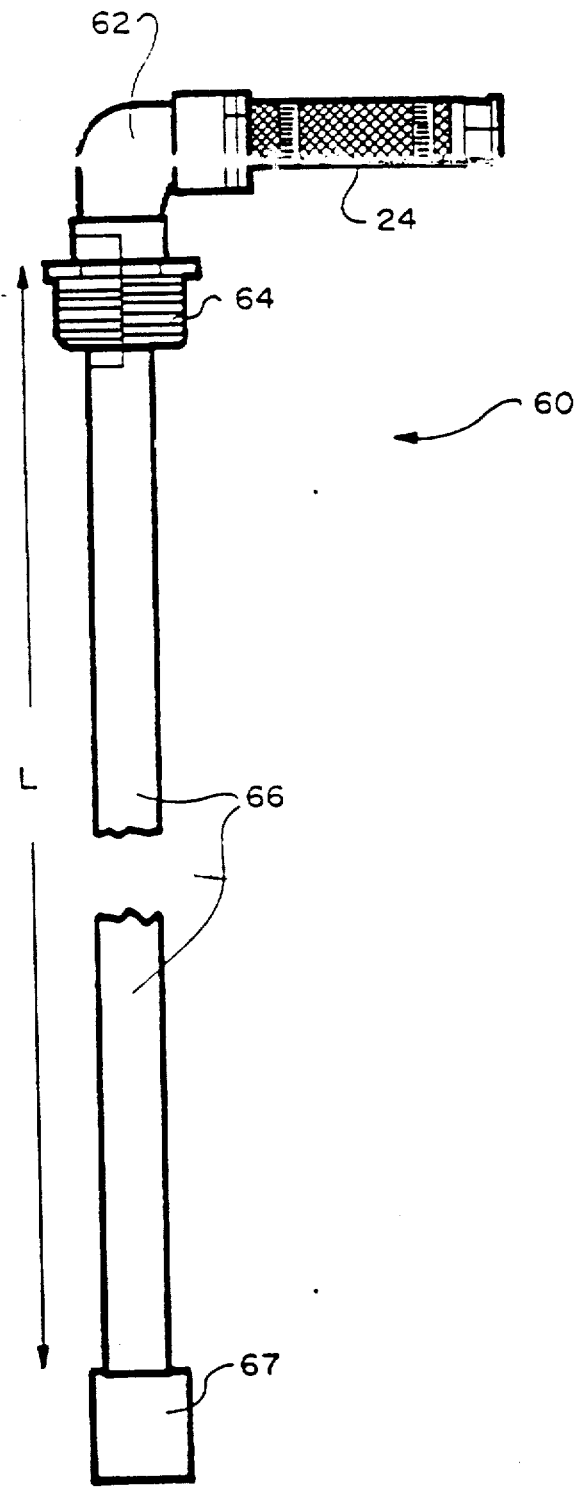
FIG. 7 is a plan view of an inlet tube used with the filtration system.

Contaminated metalworking coolant naturally tends to stratify while standing in an ordinary cylindrical container 12 such as a drum. This results in the metal particles and other sludge settling to the bottom, the oil floating on top of the water, and the remaining sludge collecting in an interfacial emulsion between the oil and water. FIG. 7 shows an inlet tube 60 which can be advantageously used with the filtration system 10 to provide improved access from the container to the fluid inlet 22 while insuring that the fluid drawn from the container 12 is taken from an advantageous place. Inlet tube 60 is constructed from pipe sections including an elbow 62, a bushing 64, a tube 66, and an optional foot valve 67 which are standard, commonly available, polyvinyl chloride (PVC) pipe sections. Elbow 62 mates with the outer end of the inlet hose 24. Elbow 62 and bushing 64 are appropriately sized to provide clearance between the inlet hose 24 and the forward hole 18. If inlet tube 60 is used, the forward hole 18 is threaded and sized to engage the bushing 64. The length, L, of the pipe 66 is sufficiently long so that intake fluid from the container 12 is drawn near the bottom, above most of the heavier metal particles, and near the water/emulsion interface. The use of inlet tube 60 also insures that the filtration system 10 will not appreciably circulate solid contaminants, thereby preventing premature fouling of the prefilter 43.

Figure 8:
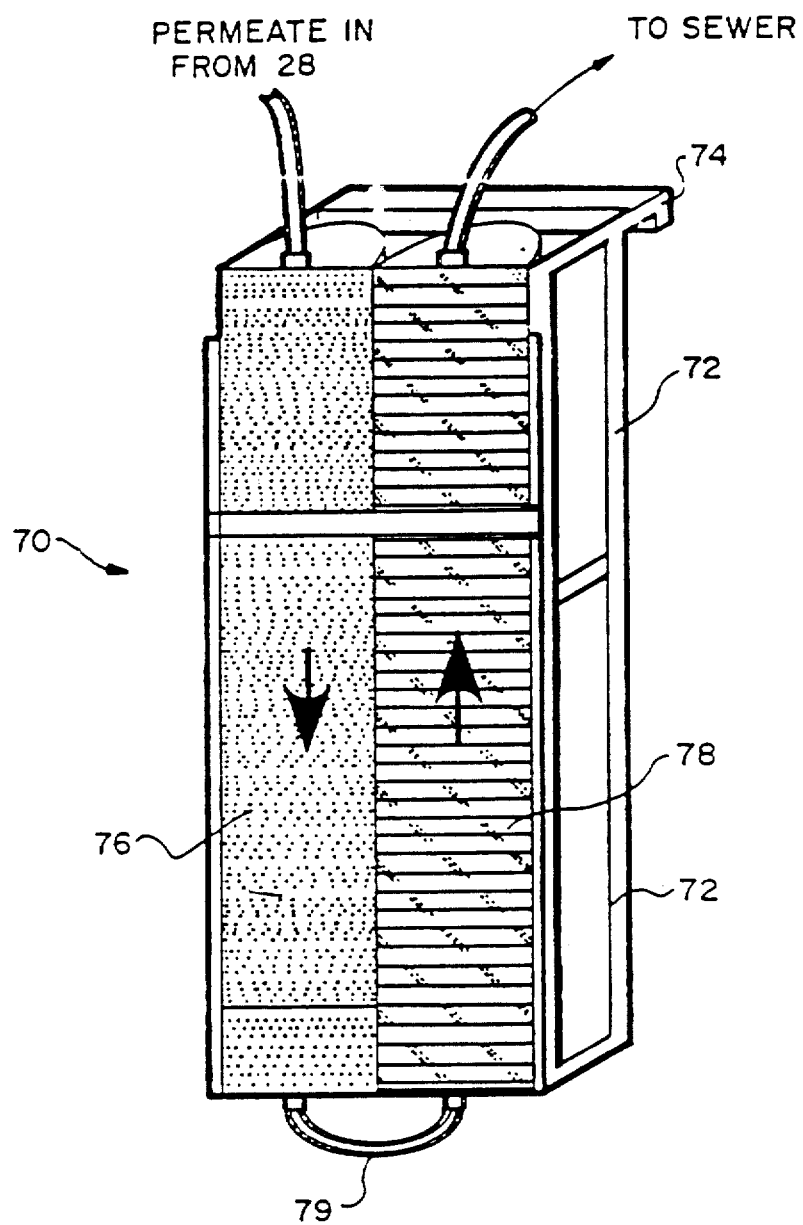
FIG. 8 is a cutaway perspective view of a post-filter module which may be used with the filtration system.

In some applications, the permeate from concentrate outlet 38 is still not clean enough to be sewered. FIG. 8 is a perspective view of an optional filter assembly module 70 which can be used to support other post-filter modules to provide additional cleaning, or polishing, of the permeate, such as an activated carbon filter 76 and demineralizing filter 78. Filter module 70 includes a frame 72 sized to hold the carbon filter 76 and demineralizing filter 78, a lip 74 formed as part of the frame 72 and adapted to engage the rim of the container 12, and a hose 79 to couple the outlet of carbon filter 76 to the inlet of demineralizing filter 78. Carbon filter 76 is particularly useful in applications where additional soluble organic matter must be further removed. Demineralizing filter 78 is necessary where dissolved heavy metals are found in the permeate from the filtration system 10. Other filter modules can of course also be cascaded in similar fashion.

It has been found that the filtration system 10 can be used to treat a broad range of waste fluids other than soluble coolants, including semi-synthetic and synthetic emulsions, machined parts washings, floor washings, and other oily waste waters.

The foregoing description has been limited to a specific embodiment of this invention. For example, other physical arrangements of the pump, filters, and tubes would produce the same advantages results. It will be apparent, however, that variations and modifications may be made to the invention, with the attainment of some or all of the advantages of the invention. Therefore, it is the object of the appended claims to cover all such variations and modifications as come within the true spirit and scope of the invention.

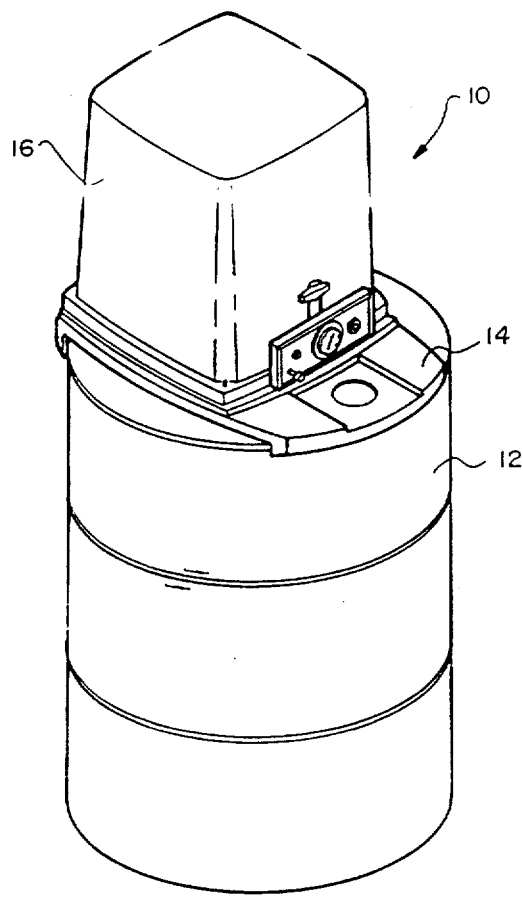

I claim:

1. A portable ultra-filtration system for filtering waste fluid contained in a storage drum, comprising:
   A. a base member having a periphery formed to engage the upper rim of the drum;
   B. a panel positioned on a front portion of the base member, the panel having a fluid inlet port, a permeate outlet port, and a compressed air port disposed therein;
   C. a compressed-air-operated pump located behind the front panel;
   D. means for enabling the pump to draw fluid from the drum;
   E. a prefilter housing containing a cartridge prefilter arranged to receive the outflow of the pump;
   F. an ultra-filter containing a membrane ultra-filter, the ultra-filter housing having a permeate outlet and a concentrate outlet;

G. a rigid conduit for mechanically coupling an outlet of the prefilter housing to an inlet of the ultra-filter housing;

H. support means for supporting the rigid conduit so that the prefilter and ultra-filter are maintained in vertical orientation;

I. means for maintaining the pressure of fluid flowing through the ultra-filter; and J. means for directing the fluid from the concentrate outlet of the ultra-filter to the drum.

2. An apparatus as in claim 1 wherein the means for enabling the pump to draw fluid from the drum additionally comprises an inlet tube arranged to provide waste fluid from the storage drum to the pump, the inlet tube having a length sufficient to insure that waste fluid is drawn from a position above any larger and heavier contaminants settled in the bottom of the drum.

3. A unitary portable ultra-filtration system for filtering waste fluid contained in a standard-sized storage drum of up to fifty-five gallon capacity, the ultra-filtration system comprising:

A. a base member having a periphery dimensioned to engage the upper rim of the standard-sized drum;

B. a pump mounted to the base member;

C. means, mounted to the base member, for enabling the pump to draw fluid from the drum;

D. a prefilter housing containing a cartridge prefilter, the prefilter mounted to the base member, and the prefilter arranged to receive the outflow of the pump;

E. an ultra-filter housing containing a membrane ultra-filter, the ultra-filter mounted to the base member, and the ultra-filter having a permeate outlet and a concentrate outlet;

F. a conduit for coupling an outlet of the prefilter to an inlet of the ultra-filter;

G. means, mounted to the base member, for maintaining the pressure of fluid flowing through the ultra-filter; and H. means, mounted to the base member, for directing the fluid from the concentrate outlet of the ultra-filter to the drum.

4. An apparatus as in claim 3 additionally comprising:

I. support means for supporting the conduit so that the prefilter and ultra-filter are maintained in vertical orientation.

5. An apparatus as in claim 3, additionally comprising:

J. a panel positioned on a front portion of the base member, the panel having a fluid inlet port, and a permeate outlet port disposed therein, the fluid inlet port arranged to receive the fluid from the drum and to provide the fluid to an inlet port of the pump, and the permeate outlet port arranged to receive the outflow from the permeate outlet of the ultra-filter.

6. An apparatus as in claim 3 wherein the pump is a compressed-air-operated pump.

7. An apparatus as in claim 3 additionally comprising:

K. means for directing the fluid from the permeate outlet of the ultra-filter to a waste container.

8. An apparatus as in claim 13 wherein the means for enabling the pump to draw fluid from the drum additionally comprises an inlet tube arranged to provide waste fluid from the storage drum to the pump, the inlet tube having a length sufficient to insure that waste fluid is drawn from a position above any larger and heavier contaminants settled in the bottom of the drum.

9. A portable system for filtering waste fluid contained in a standard-sized storage container of up to fifty-five gallon capacity, the portable filtration system comprising:

A. a base member having a periphery designed to engage the upper rim of the standard-sized container;

B. an ultra-filter housing containing a membrane ultra-filter, the housing being supported by the base member, the ultra-filter having an inlet, a permeate outlet, and a concentrate outlet, and the ultra-filter coupled to receive fluid from the container at the inlet;

C. a pump, supported by the base member, for drawing fluid out of the container and through the ultra-filter; and D. means, supported by the base member, for directing the fluid from the concentrate outlet of the ultra-filter back into the container.

10. A system as in claim 9 wherein the pump has an inlet arranged to receive fluid from the container, and an outlet arranged to provide fluid to the inlet of the ultra-filter.

11. A system as in claim 10 wherein the pump is a compressed-air-operated pump.

12. A system as in claim 10 wherein the means for drawing fluid from the container additionally comprises:

E. an inlet tube arranged to provide waste fluid from the container to the pump, the inlet tube having a length sufficient to insure that waste fluid is drawn from a position above any larger and heavier contaminants settled in the bottom of the container.

13. A system as in claim 9 additionally comprising:

F. means for maintaining the pressure of fluid flowing through the ultra-filter.

14. A system as in claim 9 additionally comprising:

G. a panel positioned on a front portion of the base member, the panel having an inlet port, and a permeate outlet port disposed therein, the inlet port arranged to receive the fluid from the container and to provide the fluid to the inlet of the ultra-filter, and the permeate outlet port arranged to receive the outflow from the permeate outlet of the ultra-filter.

* * * * *

UNITED STATES PATENT AND TRADEMARK OFFICE
CERTIFICATE OF CORRECTION

PATENT NO. : 4,929,351

DATED : May 29, 1990

INVENTOR(S) : Sanborn

It is certified that error appears in the above-identified patent and that said Letters Patent is hereby corrected as shown below:

The title page should be deleted to appear as per attached title page.

The sheet of drawing consisting of figures 1 and 2 should be deleted to appear as per attached sheets.

Signed and Sealed this

Sixth Day of August, 1991

*Attest:*

*Attesting Officer*

HARRY F. MANBECK, JR.

*Commissioner of Patents and Trademarks*

United States Patent [19]

Sanborn

[11] Patent Number: 4,929,351
[45] Date of Patent: May 29, 1990

[54] PORTABLE ULTRA-FILTRATION SYSTEM

[75] Inventor: George W. Sanborn, Walpole, Mass.

[73] Assignee: Sanborn, Inc., Wrentham, Mass.

[21] Appl. No.: 357,685

[22] Filed: May 26, 1989

Related U.S. Application Data

[63] Continuation of Ser. No. 256,749, Oct. 12, 1988, abandoned.

[51] Int. Cl.⁵ .................................... B01D 61/18
[52] U.S. Cl. ........................ 210/195.2; 210/257.2
[58] Field of Search ...................... 210/651–653, 210/195.1, 195.2, 194, 805, 806, 804, 103, 167, 168, 257.2, 321.6, 321.72

[56] References Cited

U.S. PATENT DOCUMENTS

| | | | |
|---|---|---|---|
| 4,086,164 | 4/1978 | Noda et al. | 210/651 |
| 4,636,317 | 1/1987 | Lewis | |
| 4,692,251 | 9/1987 | Hilgren | 210/651 |

Primary Examiner—Frank Sever
Attorney, Agent, or Firm—Nutter, McClennen & Fish

[57] ABSTRACT

An inexpensive portable ultra-filtration system for concentrating industrial waste fluids such as cutting coolant. The system is adapted for convenient use with standard storage containers. It is lightweight, portable, and reliable, and processes waste fluids in conformance with most local environmental regulations. Its low cost makes it ideal for small volume applications. The system operates by continuously recycling the waste fluid through a cartridge prefilter and then a carriage ultrafilter. It can process a fifty-five gallon drum of contaminated coolant to yield fifty gallons of clear permeate and only five gallons of concentrated contaminated mixture in about twenty-four hours. The clear permeate can be directly sewered in most locales. An inlet pipe may be used to keep the point of waste fluid intake above most of the heavy contaminants such as sludge, thereby lengthening the operating life of the filters. If necessary, post-process filters for the clear permeate can be conveniently installed in a frame which hangs on the side of a storage container.

14 Claims, 8 Drawing Sheets